US 9,776,756 B2

(12) United States Patent
Heeman

(10) Patent No.: US 9,776,756 B2
(45) Date of Patent: Oct. 3, 2017

(54) METHOD AND SYSTEM FOR FORMING SLEEVED CONTAINERS

(71) Applicant: FUJI SEAL INTERNATIONAL, INC., Osaka-shi, Osaka (JP)

(72) Inventor: Frederik Gerardus Heeman, Venlo (NL)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 86 days.

(21) Appl. No.: 14/356,741

(22) PCT Filed: Nov. 7, 2012

(86) PCT No.: PCT/NL2012/050778
§ 371 (c)(1),
(2) Date: May 7, 2014

(87) PCT Pub. No.: WO2013/070068
PCT Pub. Date: May 16, 2013

(65) Prior Publication Data
US 2014/0290827 A1  Oct. 2, 2014

(30) Foreign Application Priority Data
Nov. 7, 2011 (NL) ..................................... 2007730

(51) Int. Cl.
| B32B 41/00 | (2006.01) |
| B65C 3/06 | (2006.01) |
| B29C 63/42 | (2006.01) |
| B23K 26/03 | (2006.01) |
| B23K 26/38 | (2014.01) |
| B65C 9/24 | (2006.01) |

(52) U.S. Cl.
CPC .............. B65C 3/065 (2013.01); B23K 26/03 (2013.01); B23K 26/38 (2013.01); B29C 63/423 (2013.01);
(Continued)

(58) Field of Classification Search
CPC ........... B65C 3/065; B65C 9/24; B23K 26/38; B23K 26/03; B29C 63/423; B29C 2793/0009; Y10T 156/12
(Continued)

(56) References Cited

U.S. PATENT DOCUMENTS 4,100,841 A   7/1978  Amberg
6,191,382 B1 * 2/2001  Damikolas ............. B23K 26/04
                                                    156/272.8
(Continued)

FOREIGN PATENT DOCUMENTS

EP   1083129 A1   3/2001
EP   2 374 603 A1  10/2011
(Continued)

OTHER PUBLICATIONS

Dutch Search Report issued in Dutch Application No. 2007730 dated Jul. 26, 2012 (with translation).
(Continued)

Primary Examiner — Michael N Orlando
Assistant Examiner — Joshel Rivera
(74) Attorney, Agent, or Firm — Oliff PLC

(57) ABSTRACT

The invention relates to a system and method for forming sleeved containers. The system includes a conveyor for transporting a row of containers, a sleeving unit for arranging sleeves around containers and a heat oven for attaching the sleeve around the container by heat shrinking. The conveyed containers are provided with a sleeve and the sleeved container is transported in the oven to allow the sleeve to shrink. According to the invention, part of the sleeve is removed using a removal unit. The part is removed after heat shrinking. Removing the part allows to uncover part of the container otherwise covered by sleeve.

22 Claims, 8 Drawing Sheets

(52) U.S. Cl.
CPC ........ *B65C 9/24* (2013.01); *B29C 2793/0009* (2013.01); *Y10T 156/12* (2015.01)

(58) Field of Classification Search
USPC ............. 156/64, 84, 85, 250, 252, 253, 267, 156/272.2, 272.8, 367, 378, 379, 379.6, 156/380.1, 380.9, 510, 513, 526
See application file for complete search history.

(56) References Cited

U.S. PATENT DOCUMENTS

| | | | | |
|---|---|---|---|---|
| 2007/0240549 | A1* | 10/2007 | Van Heck | B26D 3/12 83/371 |
| 2011/0240588 | A1* | 10/2011 | Terrasi | B29C 63/423 215/40 |

FOREIGN PATENT DOCUMENTS

| | | |
|---|---|---|
| WO | WO 94/14605 | 7/1994 |
| WO | WO 02/26416 A1 | 4/2002 |
| WO | WO 2008/132805 A1 | 11/2008 |

OTHER PUBLICATIONS

Dutch Written Opinion issued in Dutch Application No. 2007730 dated Jul. 26, 2012.
International Search Report issued in PCT/NL2012/050778 dated Mar. 7, 2013.
International Searching Authority Written Opinion issued in PCT/NL2012/050778 dated Mar. 7, 2013.
Aug. 12, 2015 Office Action Issued in European Patent Application No. 12 788 314.8.

\* cited by examiner

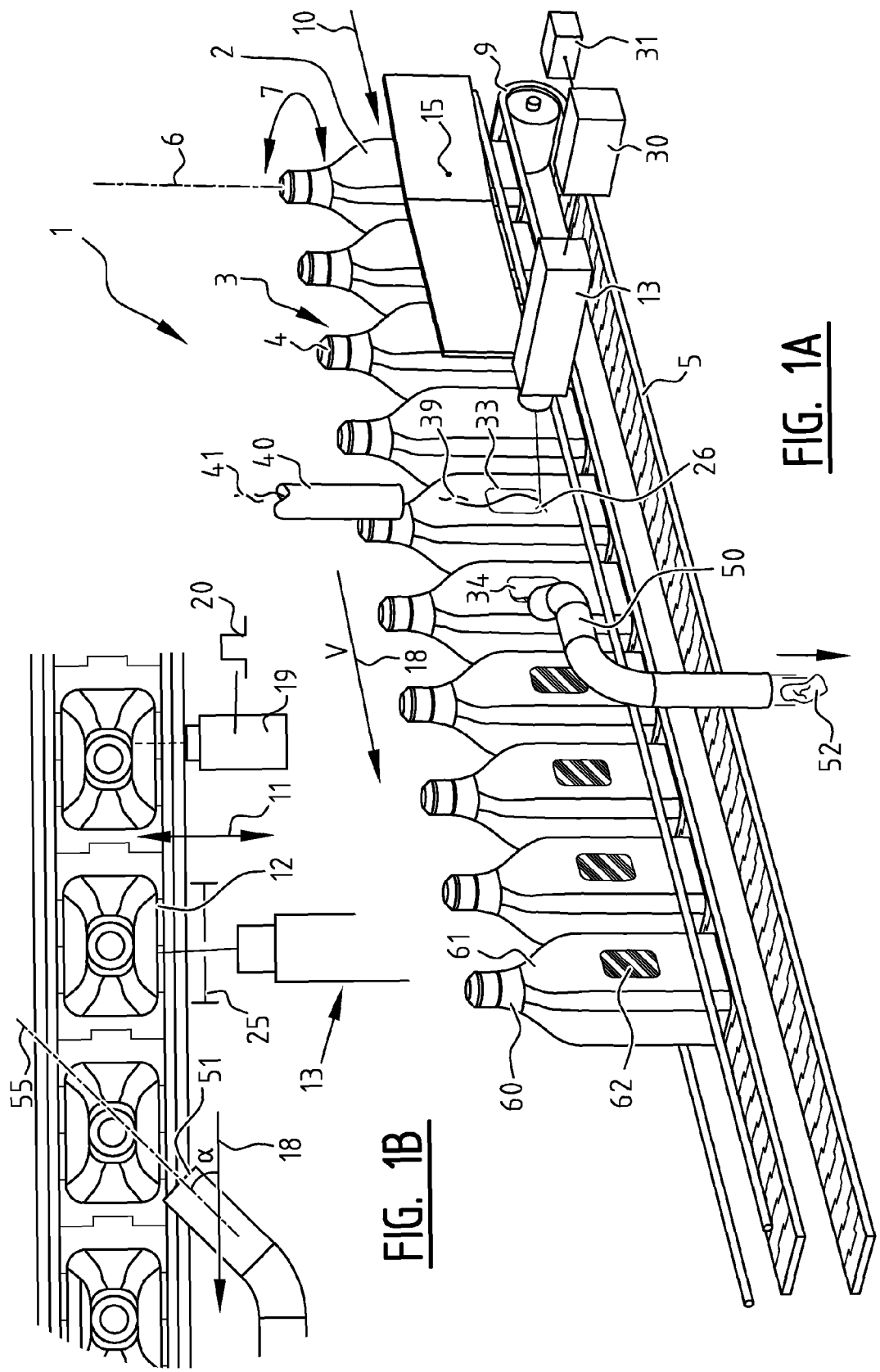

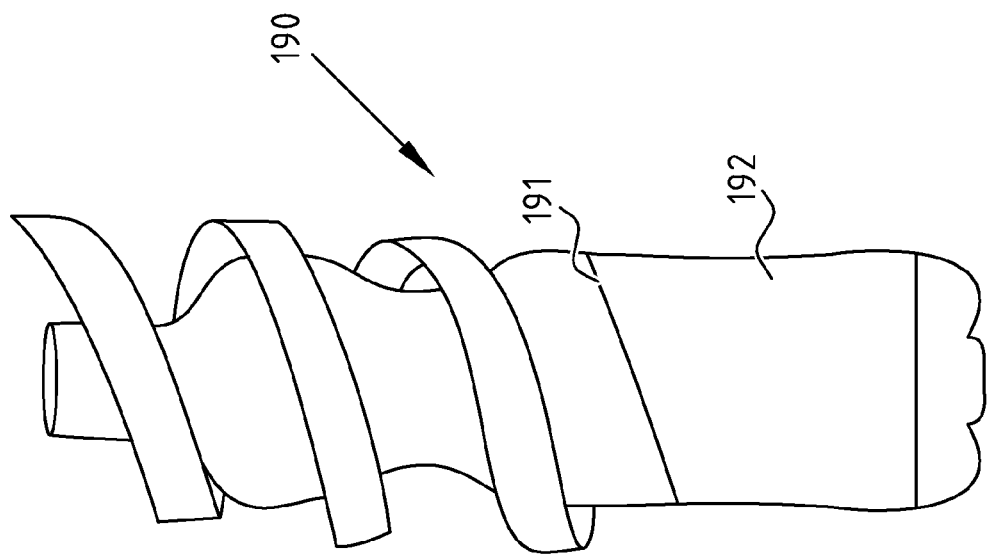
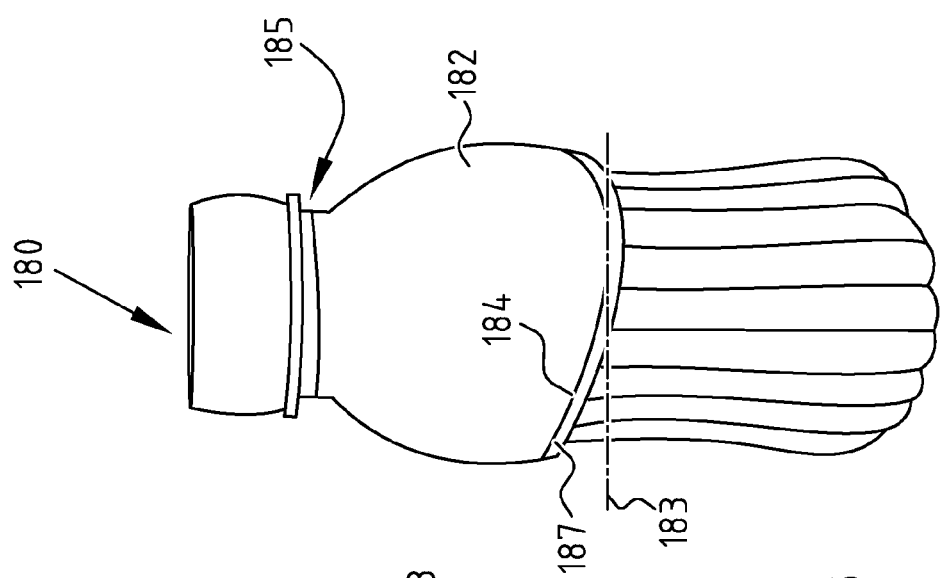
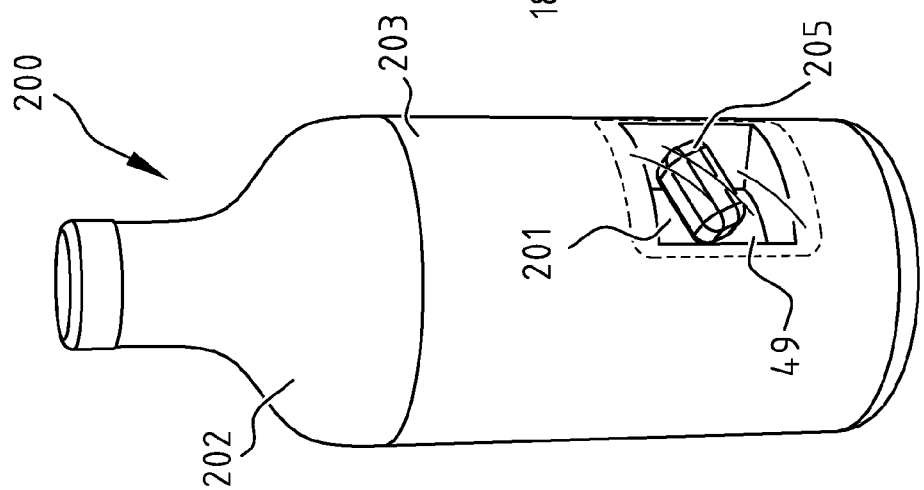

METHOD AND SYSTEM FOR FORMING SLEEVED CONTAINERS

The invention relates to a method and system for forming sleeved products such as sleeved or labelled containers. The method and system particularly relate to a processing of sleeves and products such as containers and to sleeving the product, such as a container.

It is known to provide a method for forming sleeved containers comprising, conveying a row of containers, arranging sleeves around the containers being conveyed, and attaching the sleeve to the container being conveyed by heat shrinking.

In such a method a tubular film is used as sleeve. A container, such as a PET bottle is filled with beverages such as soft drinks and generally has a cylindrical shape. It is positioned onto and carried by a transporter such as a conveyor. The film is brought around the container and will be moved through a heat oven.

A generally cylindrical label is often formed of a shrink film on which a brand name, information on the contents of the container and the like is printed. A label or film mounting system fits the envelope of film over the container A problem with known methods and systems for forming a heat shrunk sleeved container is that heat shrinking can cause disturbances such as 'smiling' or wrinkling of the film.

A further problem is that it is up to now impossible to obtain a curved ending of films instead of straight endings. As a result of the anisotropic nature of sleeve films, heat shrinking the sleeve necessitates film sleeve tubes with a straight ending. Curved endings can have a higher consumer appeal.

It is therefore a goal of the invention to improve the known method of high speed sleeving of container, increasing the appeal of the sleeved container, without significantly increasing the production costs.

This goal is obtained with the known method further comprising removing a part of the sleeve. By removing part of the sleeve the disturbance caused by heat shrinking can be removed from the product and/or a curved ending can be obtained.

In this application removing a part of the sleeve is limited to actually removing a surface part of the sleeve as scrap. The part of the sleeve that still covers the container is the remaining sleeve part.

Although JP6127535A describes a method for forming sleeved containers having a heat shrinkable film provided with a cut to allow easy removal of the film. This known method lacks actual removal of a part of the sleeve during production. The known method intends to allow a user, after production, to remove the complete film, not a part of the film.

Also JP53123294A and JP5899336A disclose methods to fully remove a seal from a container, e.g. for recycling purposes. None of the disclosures is directed at improving the method for forming sleeved containers.

From EP 2 374 603 stamping a shape in the foil strip is known.

Although a part of the sleeve can be removed prior to heat shrinking, this could cause deformations in the film during and after heat shrinking. Preferably according to the method removing the part is performed after heat shrinking. In this method the part to be removed is present during heat shrinking.

In an embodiment of the method removing the part of the sleeve comprises cutting the part out of the sleeve. Cutting the part to be removed allows separating the remaining sleeve part around the container from the removed part.

In an embodiment removing the part of the sleeve comprises at least two separate steps performed in different stages of the method. In a first step forming of the part of the sleeve to be removed is initiated. This forming can comprise partially cutting the part to be removed. Cutting can comprise forming perforation. By forming perforation the sleeve part that is to be removed is still connected to the rest of the sleeve. In a subsequent step, performed downstream the sleeve part to be removed is completely detached from the remaining part of the sleeve. This allows collecting the detached part in this step of the method.

In an embodiment at least detaching the part of the sleeve is performed after heat shrinking. During heat shrinking the part to be removed is still present and is exposed to heat shrinking. During the heat shrinking step is close to undisturbed. Still an initial step to allow removal of the sleeve part to be removed can already be performed, such as applying perforations, upstream from the heat shrinking step.

In an embodiment removing the part of the sleeve comprises laser cutting the part out of the sleeve. Laser cutting can be performed on the fly, that is while the sleeved container is being conveyed.

Laser cutting is known, e.g. from WO99/51386. It was discovered that a laser cutting method can be used in combination with heat shrunk sleeves around a container, with a minimum of damage to the container for removing a part of the sleeve. This allows using the methods and apparatus disclosed in WO99/51386 can be used in combination with the method of this invention even though the methods/apparatus according WO99/51386 are disclosed for laser cutting a single layer of foil only.

It was further discovered that even though the foil sleeves are curved around the container, not in a single plane, a laser cutting method can be used for cutting a part of the sleeve and (partially) detaching it from the remaining part of the sleeve.

In a further embodiment the laser cutting comprises ventilating vapours formed by the laser cutting process. Vapours occur as a result of laser cutting and these vapours can disturb subsequent laser cutting of a next sleeved container. By ventilating the vapours e.g. by providing suction, the possibly harmful vapours are removed from the laser cutting site.

In an embodiment the laser cutting comprises guiding a laser beam over the sleeve to cut a desired part of the sleeve around the container being conveyed. The position of the resulting laser beam, and in particular the laser point can be controlled such that a pattern is cut into the sleeve. Suitable control of the laser spot can be obtained by using movable reflectors/mirrors.

Preferably the method comprises focussing a laser beam onto the sleeve. By focussing the laser beam, the power of the laser beam is focussed. In an embodiment a laser unit having automatic focus is used.

Although the method can be used to remove a part of the sleeve near the outer edge of the sleeve, such as to create a curved ending or to remove smiling, in a preferred embodiment the part of the sleeve that is to be removed is remote from a peripheral edge of the sleeve. A through hole is formed in the sleeve.

In an embodiment laser cutting the part of the sleeve comprises irradiating boundaries of the part, wherein boundaries extending in a circumferential direction of the container are irradiated more than boundaries extending in an axial direction of the container. As a result of the use of anisotropic heat shrinkage sleeve material, the cutting behaviour of the sleeve is different in the horizontal (circumferential direction of the container, i.e. the heat shrinkange direction) versus the vertical (axial direction of the container, i.e. perpendicular to the heat shrinkage direction). The vertical cut is easier to realize than the horizontal cut.

Because of the heat produced during cutting the sleeve wants to shrink which opens the sleeve by itself. This behaviour can be used to reach optimal cutting speed, wherein the vertical cuts can be made at higher speed than horizontal cuts or vertical cuts can be made with less power.

In an example the laser device is arranged, not only to cut the foil for foil removing, but is also arranged to print signs on the foil and/or to auxiliary shrink the foil, e.g. as a result of imperfections during the heat shrinking in the heat shrink oven. The spots for focussing the laser can be provided by an imaging system in combination with a triggering system. In an example the laser device is also arranged to seal an auxiliary foil, such as a tear sleeve, to the foil.

In an embodiment removing the part of the sleeve comprises air sucking the part of the sleeve from the sleeved containers being conveyed. By using air sucking the part of the sleeve is removed as a scrap material and is collected. This prevents loose scraps at the production site. The air sucking can be used to completely detach a still partially connected part of the sleeve, e.g. by breaking the connections with the remaining sleeve part.

In an embodiment the method comprises providing an area of under pressure, conveying the sleeved containers through the area of under pressure and disposing the part of the sleeve to be removed.

In an embodiment removing the part of the sleeve comprises engaging the part of the sleeve e.g. by clipping and squeezing. The engaged part is torn from the remaining label by twisting the part. This mechanical removing is very reliable.

In an embodiment the method further comprises covering a chamber formed on an outer surface of the container by the sleeve and wherein removing the part of the sleeve uncovers the chamber. The outer surface of the container or bottle can have a chamber having a depth with respect to the rest of the outer surface. The heat shrunk sleeve is stretched over the chamber covering the chamber. By removing the part of the sleeve covering the chamber, said chamber become accessible from the outside and can be used e.g. as a handle for easily gripping/holding the sleeved container.

In an embodiment a toy or an article can be received in the chamber formed in the bottle and covered by the sleeve.

In an embodiment conveying the row of containers comprises measuring a position of a conveyed container and wherein removing the part of the sleeve is triggered, with a delay, by the measured position. Detecting the position of the sleeved container in combination with the velocity of the conveyor allows calculating the arrival time of the container in the area suited for laser cutting.

In an embodiment conveying the row of containers comprises moving the containers at a speed of at least 1 m/s, preferably 5 m/s. This allows forming sleeved containers at high speeds and low costs.

In an embodiment the method further comprises removing water droplets on the sleeved containers after heat shrinking the sleeves. This prevents the presence of water droplets on the sleeve that could disturb e.g. the laser cutting. The water droplets can unfocus/scatter the later beam, resulting in less power for cutting the film.

In an embodiment attaching the sleeve to the container also comprises gluing the sleeve to the container. Preferably boundary parts of the remaining sleeve part around the container are provided with glue. After removal of the part of the sleeve the remaining part of the sleeve is still well bounded or attached to the container.

According to a further aspect a system for forming sleeved containers is provided. The system can comprise a conveyor, a sleeving unit and a heat oven. The conveyor is arranged for transporting a row of containers. The sleeving unit can arrange sleeves around containers, the sleeving unit arranged to cooperate with the conveyor. The heat oven can attach the sleeve around the container by heat shrinking. The conveyor is arranged through the heat oven downstream from the sleeving unit. Such a system can manufacture sleeved containers at high speed with low costs. The system is improved when the system comprises a removal unit for removing a part of the sleeve and arranged along the conveyor downstream from the heat oven. The removal unit allows removing a part of the sleeve. Disturbances as a result of heat shrinking, such as 'smiling' can be reduced. By removing an ending part of the sleeve curved endings of the sleeves can be obtained.

In an embodiment the removal unit comprises a laser device for irradiating the sleeve and cutting the part of the sleeve. This allows to laser cut the part of the sleeve that is to be removed. When cutting with a laser there are little limitations of the shape of the cutting line. It is also possible to cut out a piece of sleeve at the cutting line. Laser cutting has no wearing parts, has improved reliability of cutting with mechanical parts, such as blades, has much easier operator handling and can be adjusted quickly.

In an embodiment the laser device comprises a control device for directing a laser beam onto the sleeve around the container being conveyed in a pattern in accordance with the part of the sleeve to be removed. In an embodiment the laser unit comprises a memory for storing a program for cutting a desired part of the sleeve. From e.g. WO99/51386 it is known how to cut a desired pattern in a moving object, on the fly.

In an embodiment the removal unit further comprises a ventilation device for removing vapours formed as a result of laser beam irradiating the sleeve. Not collecting the vapours could eventually disturb the cutting process.

In an embodiment a sensor is arranged upstream from the laser unit along the conveyor for measuring a position of the sleeved container, the sensor connected to the laser unit arranged to initiate the laser unit to cut the desired part of the sleeve. The sensor allows tracking the position of the container/sleeve with respect to the sensor and eventually with respect to the laser. If the sensor is positioned a distance upstream from the laser, initiating the cutting with the laser is started after sensing the arrival of a sleeved container at the sensor with a short delay, dependent on the speed of the conveyor.

In an embodiment the laser unit comprises a power configuration device for varying the laser beam power. This allows varying the intensity of the laser beam during cutting. In an embodiment axial cuts in the sleeve are performed with less power than horizontal/circumferential cuts.

In an embodiment the removal unit comprises an air suction unit positioned along the conveyor for removing the part of the sleeve by air suction. The air suction unit, in an embodiment a vacuum cleaner, allows the final detaching of the part of the sleeve that is to be removed.

Preferably the part of the sleeve that is to be removed is prevented from falling out to early by not cutting the part loose completely. The remainder part of the connection is weak and can be broken by suction forces.

In an embodiment the air suction unit is positioned downstream from the laser unit. Air inlets are formed between the air suction unit and laser unit for allowing inflow of air to the conveyor. Both laser unit and air suction unit can comprise an air vent. The inlets prevent the two air vents from disturbing each other.

In an embodiment the air suction unit comprises an inlet hose positioned along the conveyor directed at least in an upstream transport direction. Preferably the inlet hose is directed at an angle between 20-75 degrees with respect to the conveyor direction. During removal of the art of the sleeve, the suction force takes the foil part out into the suction opening or inlet hose. In the mean time the sleeved container is transported further on and the foil becomes more and more folded around the corner of the suction opening. The forces that now pull on the sleeve can be bigger than the suction force alone. This improves the reliability of removing the foil.

In an embodiment the system further comprises a drying unit positioned downstream from the heat over along the conveyor arranged to dry sleeved containers. This removes water droplets present on the sleeved container that could disturb the laser cutting.

According to a further aspect a method and device are provided to forming sleeved containers. A row of containers is conveyed and sleeves are arranged around those containers. The sleeve is attached to the container by heat shrinking. The method and device further comprise removing a part of the sleeve by laser cutting. The laser cutting can be performed before or after heat shrinking the sleeve to the container. In an embodiment the laser cutting unit is positioned upstream from the heat oven.

According to yet a further aspect a method and device are provided to forming sleeved containers. A row of containers is conveyed and sleeves are arranged around those containers. The sleeve is attached to the container by heat shrinking. The method and device further comprise removing a part of the sleeve by cutting close to completely the part to be removed and subsequently engaging the part to remove the part. Engaging can comprise direct engagement by e.g. a grabbing unit or indirectly by sucking (reducing locally the pressure).

Any of the methods/devices disclosed herein according to any of the aspects can be combined with any of the implicit/explicit features disclosed herein.

Now the invention will be disclosed in more detail referring to the drawings showing embodiments of the invention. The shown embodiments do not limit the scope of protection of the invention but illustrate examples thereof. It will be clear to a person skilled in the art that features mentioned in the embodiments illustrate preferred embodiments, but can be replaced by other less preferred features. A skilled person will be able to generalize the examples as provided and these examples are also part of this disclosure and divisional applications could be directed at these explicit or implicit or generalized features.

The drawing shows:

FIG. 1A a view in perspective of a system and method according to a first embodiment;

FIG. 1B shows a top view of the first embodiment,

FIGS. 6, 7 and 8 show other embodiments of a container.

Figure 2A:
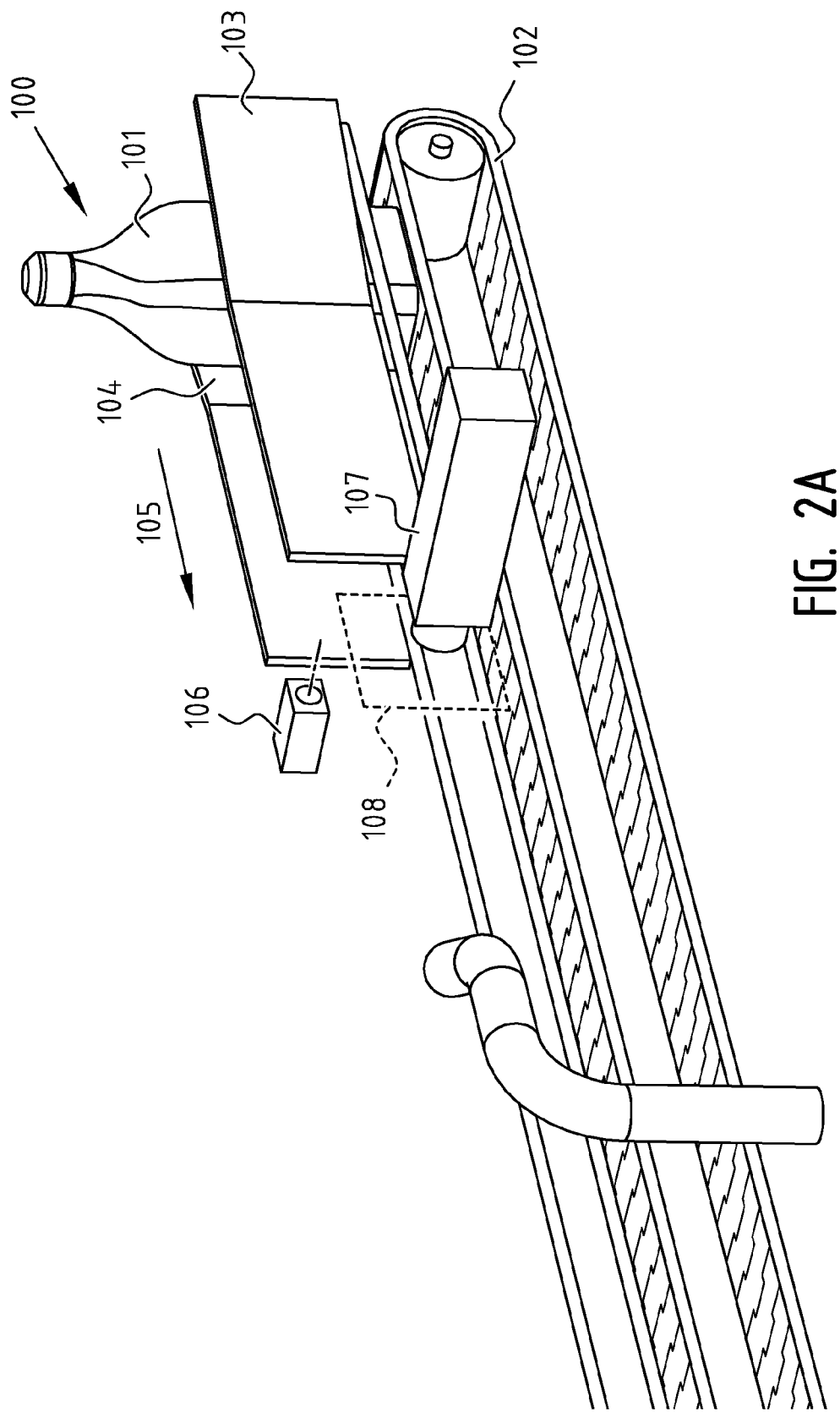
FIGS. 2A-2C show steps of the method and device according to the first embodiment of the invention.

FIG. 1A shows schematically a part 1 of a system for arranging a sleeve around a container, said system specifically arranged for removing a part of a heat shrunk foil or sleeve 2 arranged around a container 3 such as a one liter bottle 3 as shown in FIG. 1.

Containers 3 are filled with a product such as a liquid in particular a nutritious fluid, but can also be filled with a solid such as a granulate laundry detergent. In some embodiment the container can comprise pens or batteries. The invention is not limited by the shape, size and content of product, such as container 3. Container 3 can have a closure 4 such as a lid or dispenser. The invention is not limited by the form of the closure 4.

Label 2 is arranged to display useful information regarding the content of the bottle 3. It can provide trademarks indications, content indications and other graphics for recognition of the potential buyer of the container. Containers 3 with labels 2 are provided to wholesale stores, grocery stores and are sold in packs or sold separately.

In a first step of an embodiment of the method and in an upstream part of the system according to the invention, not shown in FIG. 1, the containers 3 are filled. The filled containers 3 are positioned on a conveyor such as a conveyor 5 supporting the container 3 in a standing or upright position. The invention is not limited to the position of the container.

In the shown embodiment in FIG. 1A container 3 has an axial direction 6 and a circumferential direction 7. The invention is not limited by the cross-section of containers. Generally it will be possible to recognize an axial direction 6 as the direction of the bottle having one end provided with the closure 4. The circumferential direction 7 can be defined by the direction surrounding the axial direction 6. Label 2 is provided in the circumferential direction 7 and is provided around the axial direction 6.

As part of the method and device according to the invention an upright container 2 is fed by a conveyor to a sleeving device arranging sleeves around the container. In an embodiment the sleeving device comprises a foil feeder. Foil is fed to the sleeving device and in particular to a mandrel that opens the foil into a tubular shape. The foil is cut to obtain individual sleeves. The individual sleeves are transported and arranged over a container 3. In a subsequent step the label/sleeve 2 is heat shrunk in an oven around the container 3. The label 2 now tightly fits around the container such that it is attached to the container. Sleeving devices, foil feeding and heat shrink ovens are known as such. Reference is made to earlier applications by the same applicant, included by reference, such as WO2011/031160, WO 2008/088210 A1 and NL application number 2006752. In a further step of an embodiment invention the labeled container is dried such that liquid droplets are removed.

A method can comprise further steps for handling and processing the container and sleeve as well as the labeled container. The containers with heat shrunk labeled 2 are provided to conveyor 5 at an upstream end 9 of system 1.

Filling of containers, sleeving and heat shrinking can be performed at different, possibly remote, locations.

Containers 3 are provided near the upstream end 9 of system 1 and are conveyed by conveyor 5 in direction 10. As a first step of the embodiment shown in FIG. 1A the containers 3 are positioned at a generally exact position with respect to a fixed point of the (not shown) frame of the system 1.

In FIG. 1B distance 11 shows such a fixed distance. In FIG. 1B distance 11 is the distance between a side 12 of container 3 and the tip of laser device 13. Guides 15 are positioned on both sides of the conveyor 5 in a V-shape/funnel shape directing the containers to the centre of the conveyor 5.

In the shown embodiments the container 3 is positioned centrally along the longitudinal axis of conveyor 5. The guides 15 are positioned such that a space in between is exactly enough to allow passage of container 3 in the conveyor direction 10.

When conveyed downstream according to direction 10 as a further step of the method the container 3 is transported along sensor 19. Sensor 19 can detect presence of a container in front of the sensor. Detection results in transmission of a trigger signal 20 that can be sent to laser device 13 or laser control 30.

In another embodiment sensor 19 is arranged to capture an image. Sensor 19 can be connected to a controller allowing to compare a captured image with a memorized picture. Certain captured images can trigger the transmittal of a trigger signal 20.

Trigger signal 20 triggered by arrival of a front end of container 3 in front of sensor 19, in combination with a conveyor speed 18 allows the laser device 13 or a laser control 30 to calculate the arrival time of the container 2 in front of the laser 13 or at least within a operating window 25 of the laser spot. The conveyor speed 18 is in an embodiment at least 1 m/s. The trigger sensor 19, in particular in combination with the guides 15, results in specific knowledge of the position of the container 3 when moved by conveyor 5 and allows synchronizing downstream applications with the arrival of labeled containers 3.

The operating window 25 of laser device 13 is the window within which the laser spot 26 can operate on the label 2. The laser spot 26 is directed by e.g. reflectors present within the laser device 13. As the area of focus of the laser device is limited as well as the angle of the reflectors, the laser spot is applied to the label 2 within a limited window of operation.

Laser device 13 fixated to a (not shown) frame, is shown schematically only in FIG. 1A. Laser device 13 is mounted to a (not shown) frame of the system 1. The laser device 13 is directed towards the conveyor (also fixed to the frame), and more specifically at the labels 2 around containers 3 transported by conveyor 5. The laser device 13 is connected to an energy source and can be connected to or can comprise a laser control 30.

Laser control 30 can configure e.g. the power of the laser beam, the direction of the laser beam and on/off. The direct of the laser beam can be controlled by driving reflectors in the laser device 13.

In an embodiment laser control 30 comprises a memory 31. Memory 31 can be an external memory, a programmable memory or can be a memory that can load a program. Memory 31 is suitable for storing a program comprising a path (or pattern) for the direction of the laser beam and more specifically the laser beam spot 26. The laser beam can be focused such that laser beam spot 26 is focussed on a distance 11 substantially equal to the distance between the tip of laser device 13 and the surface 12 of label 2 around container 3.

Memory 31 can provide a path, e.g. path 33 for the laser beam spot 26. If the laser beam spot 26 executes path 33, the laser beam spot will cut a generally rectangular shape 34 in label 2.

Trigger signal 20 as provided by sensor 19 can trigger the laser device 13, via control 30, to initiate the cutting of label 2 according to the loaded pattern.

In an embodiment transport of the container 3 with label 2 is temporarily stopped in front of laser device 13. The laser beam spot 26 executes path 33 and part 34 is cut.

In another, more preferred embodiment, the container 3 is moving during cutting. In this embodiment the path 33 is corrected for the velocity V 18 of conveyor 5 in direction 10. A skilled person will be able to configure a cutting path 33 that will cut a part 34 in label 2 while moving. In an embodiment control 30 is provided with velocity V 18 is comprises a program to adapt a path 33 provided by memory 31 dependent on the velocity V 18.

Due to a difference in thickness of material used for the container 3 and label 2 and as a result of optimum control of laser power toward the cutting path 33, laser cutting label 2 will cut label 2 with a minimum damage to container 3, even when container 3 is formed from a similar plastic material as the sleeve. Container 3 will be formed of material with greater thickness. The laser beam will not melt and cut the container wall.

In an embodiment a wall of the container 3 is formed at a distance from the part of label 2 that is to be cut. An example is shown in FIG. 6. Wall 49 is covered by label 203 but is positioned at a distance from the label 203. Due to the difference in distance, the wall 49 of the container 200 is positioned at a greater distance from laser beam spot 26, such that that wall 49 part of the container 203 will receive laser light that is not completely in focus, lowering the power of the laser spot, resulting in less damage/zero melting of the container wall.

Laser device 13 can be 60 W, 10200 nm CO2 laser with fixed focus or can be an automatic focus laser device. Other laser device are possible. Preferably a infrared or far-infrared laser device is used. In an embodiment laser device 13 can comprise multiple laser beams or multiple laser device 13 can be part of the system for forming sleeved containers 1 according to the invention.

Part 34 is formed as a result of cutting the label 2. Shape 34 can have any circumference. In the shown embodiment part 34 is formed within label 2. In another embodiment part 34 is formed near an edge of label 2 and a part of shape 34 is part of the circumference of label 2.

Cutting the label 2 results in local melting of the label and evaporation of label material. Fumes or vapours 39 can be the result. Fumes 39 can be ventilated using a exhaust 40 having an entrance 42 near the laser window 25 of the laser device 13. Fumes 41 can be collected in a filter (not shown) or can be released at a safe location, e.g. outside the plant. A suitable pump (not shown) can be used to ventilate the fumes 39/41.

In an embodiment part 34 is separated from label 2 only partially. As a result of the partial separation part 34 will hold its position with respect to label 2. Further downstream from laser device 13, an air suction unit 50 is positioned having an inlet 51. The air suction unit 50 will provide a local under pressure at a position close to the passage of part 34 when the container 3 is transported further downstream. The local under pressure will result in tearing the remaining connections of part 34 with label 2. Part 52 is released and can be collected for disposal. In this embodiment the removed parts can be collected and the plant is not contaminated with loose parts 34.

Inlet 51 has an inlet direction 55. Direction 55 is positioned at an angle alpha with respect to the transport direction 18.

After removal of part 34, a container 60 having a label 61 without a part 62 is obtained.

In FIG. 2A a labelled container 100 having a sleeve 101 arranged around and attached to the container by heat shrinking is provided by conveyor 102. Guiding plates 103,104 are funnel shaped in the conveyor direction 105. Guiding plates 103,104 position the container 100 at a fixed distance with respect to the conveyor/frame (not shown).

As the container 100 moves downstream in direction 105, the container will pass sensor 106. Passage of the container 100 will trigger a trigger signal that is sent to laser device 107. Laser device 107 will be able to calculate when the container will arrive in the operating window 108 of laser device 107. The operating window is the window in which laser device 107 can aim the laser beam spot using e.g. actuators for moving reflectors.

Triggering of the laser device 107 is especially important when the position of the part 115 that is to be removed is important with respect to the position of the container. The sensor in combination with the positioning guides 103/104 position the container and allow cutting of a part 115 with an exact position with respect to the container.

In another embodiment a sensor can recognize a sign or graphic that is present on the label. When recognized, the sensor will send a trigger signal. In that case the label position is more important and laser cutting is synchronized with the label position.

Figure 2B:
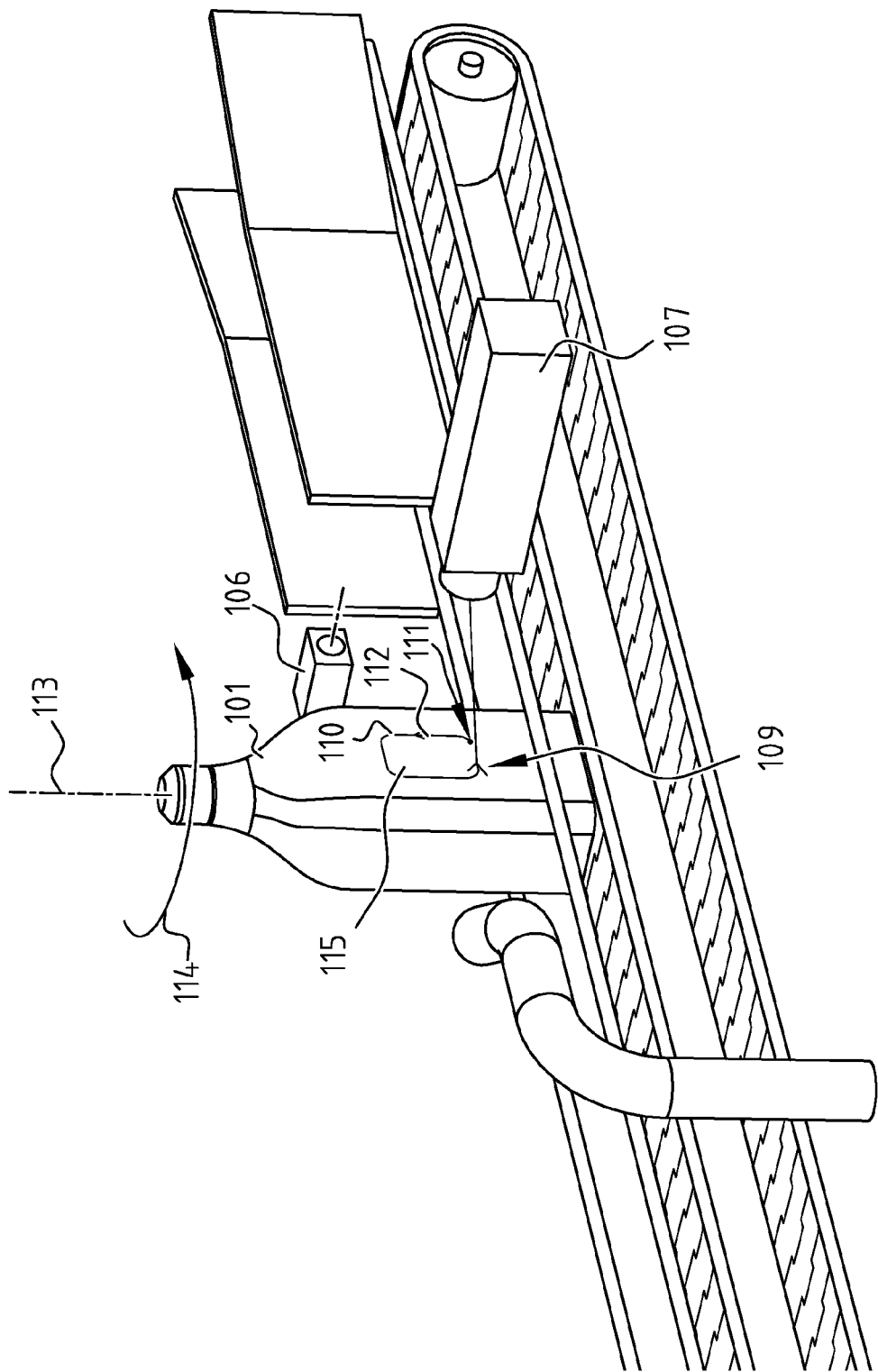

FIG. 2B shows the container 100 in the operating window 108 of laser device 107. The laser device 107 is now 'on' and laser beam spot is directed toward position 109.

In this embodiment a laser cut 110 is made of generally rectangular shape in label 101. In this embodiment cutting was started near starting point 111 and the spot was moved such that cut 112 was created onto the current position of spot 109. From spot 109 the laser spot will be moved more or less horizontal (in the circumferential direction 114 of container 100 having an axial direction 113). The laser spot will than coincide with a location already cut.

Moving the spot 109 over the surface of label 101 will result in partial melting and/or evaporation of the label material. The power of laser cutting can be dosed such that the laser spot cuts most of the label, but still some partial connections remain. As a result the part 115 that is to be removed will still hold position.

As the label 101 is a heat shrink material, it will have heat shrinking properties, such as anisotropic shrinking properties in the vertical and horizontal directions. As the sleeve will shrink mostly in the circumferential direction 114, most tensions in the label will be present in this direction. As a result, the part 115 that is to be removed, will separate more easily with respect to vertical cutting lines, such as line 110, than horizontal cutting line, such as the cutting line being cut by spot 109. Further as a result, the power of the laser spot can be lower in vertical cutting lines of the path than horizontal lines. This is controlled by the laser device e.g. by moving the laser spot quicker in vertical parts of the cutting line than horizontal parts. In another embodiment the power of the laser/laser spot is varied accordingly. The movement and/or power control can be calculated by the laser device 107 or laser control 30 or can be calculated using an outside source and is inputted via memory 31 into the laser device 13,107.

Figure 2C:
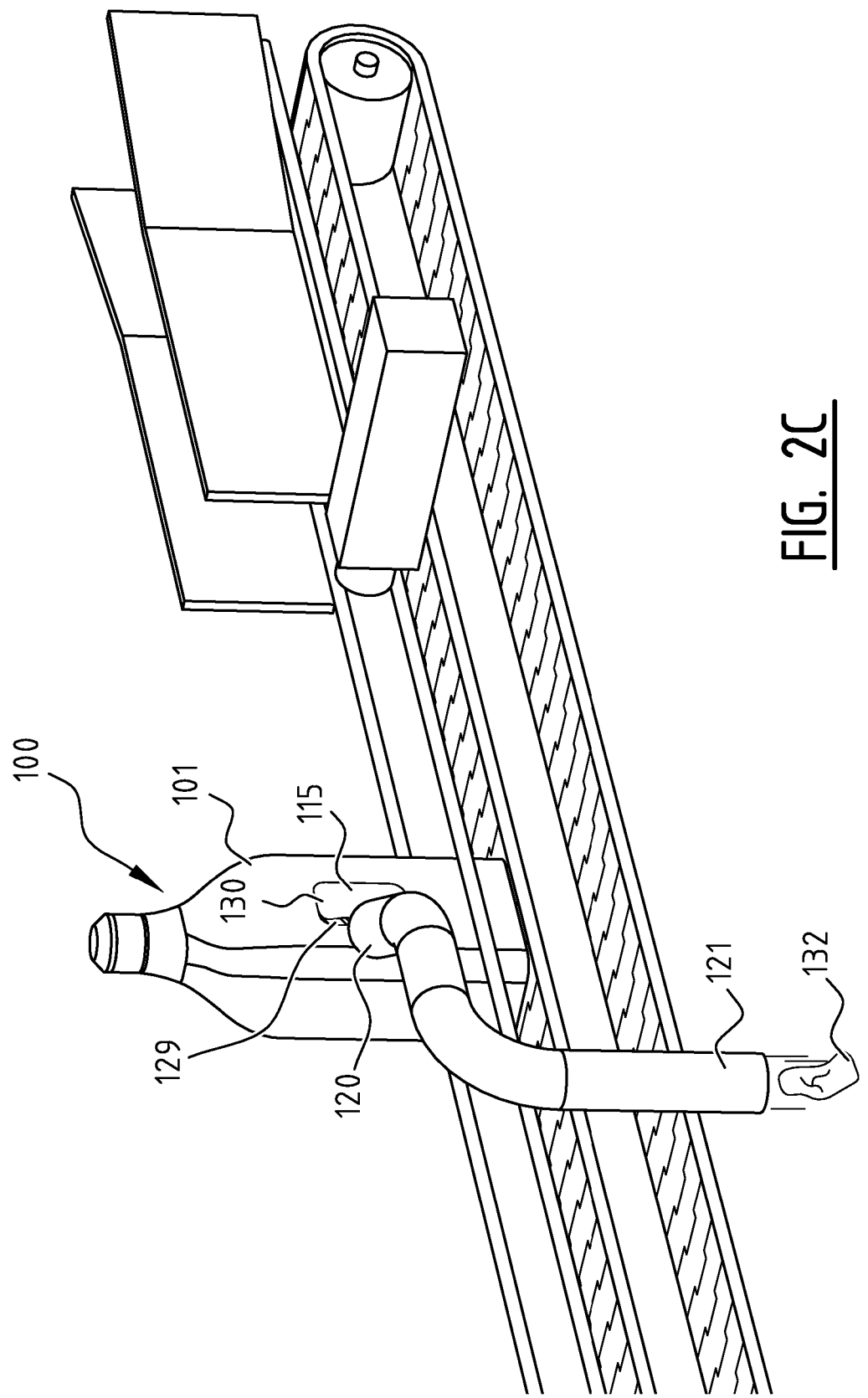

In a further step of the method as shown in FIG. 2c the container 100 is transported downstream. The complete cutting pattern is now applied to the label 101. The part to be removed 115 is only partially still connected to the label. The air inlet 120 of hose 121 is directed towards the conveyor 102.

It will be clear for the person skilled in the art that other patterns different from the rectangular part 115 can be used in combination with the invention.

In another embodiment only a perforation line is formed in the label.

In yet another embodiment a label is arranged around the container already having a perforation line prior to heat shrinking. The perforated line can be formed prior to sleeving the container. The laser cutting is not necessary in such an embodiment.

Triggering as a result of the position of the container or label can still be used to position the part to be removed/container with respect to the part removal unit 121.

As a further step of the method, air is sucked into the part removal unit formed by hose 121 connected to a vacuum pump (not shown). As a result of the penetrations in the label 101, it was discovered that this results in an under pressure in the area behind the label, between the part 115 to be removed and the container wall surrounded by the label, especially when a chamber is formed between label 101 and the container wall. The chamber can be the result of a cavity or retracted surface of the container 100. This under pressure first results in the part 115 to be moved backwards, into the chamber. This results in tearing of the partial connections that still connect the part 115 with the label. In a further step at first the vertical cutting line 129 tears and the part 115 is sucked outwardly into a position as shown in FIG. 2C. While the container 100/conveyor 102 is still moving forward the loose end 130 will collide with the air inlet 120. Friction as a result of the collision, the moving on of the container 100 on the conveyor 102 and the air suction will result in tearing the remaining partial connections and disposal 132 of the part 115 to be removed.

In an embodiment glue or another attachment product is applied to or near the cutting lines of the part to be removed. This allows attaching the remaining edge of the separated part to be connected to the container, which will decrease the changes of further tearing of the label near the removed part.

Other embodiments for removing the part 115 also fall within the scope of protection. A part removal unit can comprise an engagement tool such as a clip, to squeeze a part of the foil to be removed between two arms of the clip. As a part is gripped, the clip/two arms can rotate in order to tear the part to be removed from the remaining label.

Figure 3:
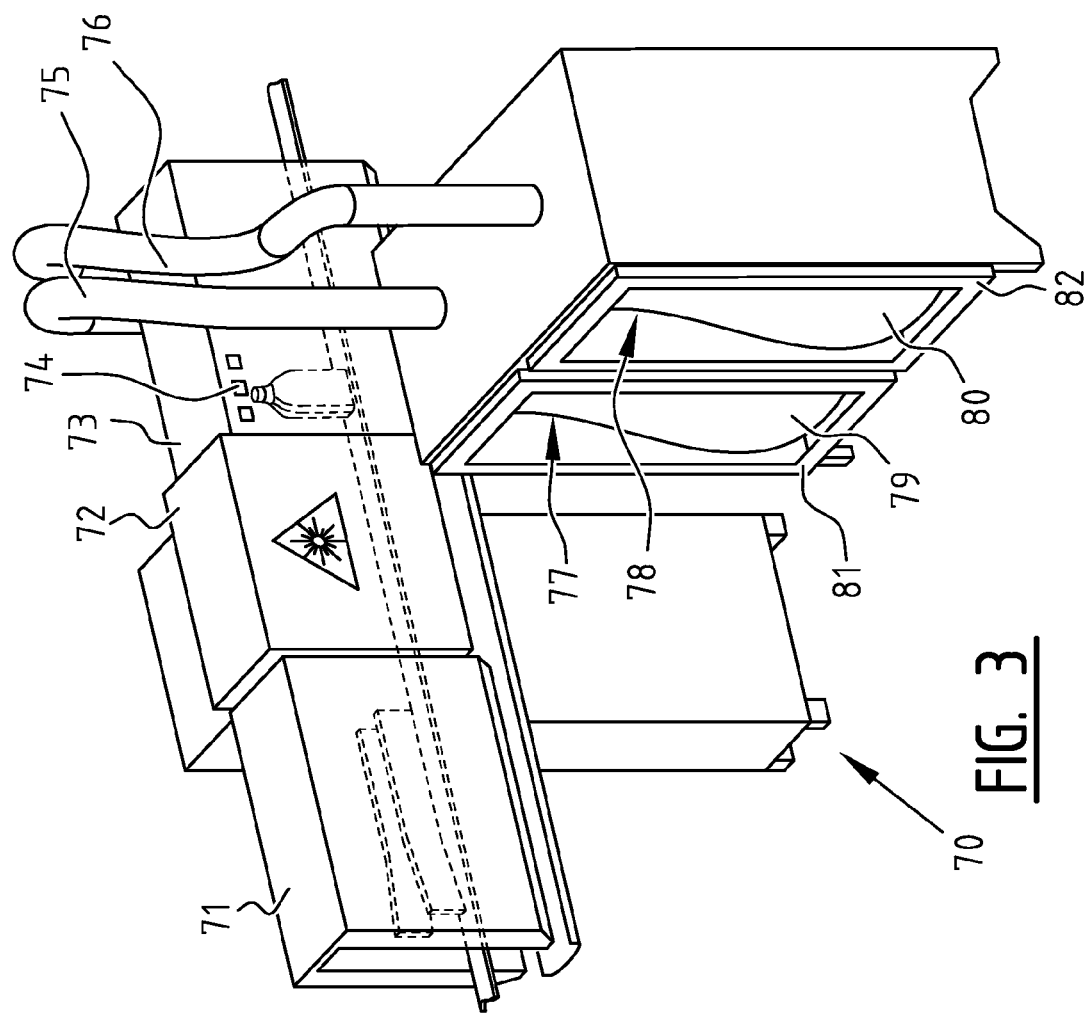
FIG. 3 shows a perspective view of an apparatus according to an embodiment of the invention.

FIG. 3 shows a further embodiment of the partial system according to FIG. 1. Now parts of the frame 70 are shown. In the shown embodiment conveyor 5 is surrounded by respective housing parts 71,72,73. Housing 71 surrounds the position guides 15, housing 72 surrounds the laser device 13 and housing 73 partially surrounds the part removal unit. FIG. 3 shows more details with respect to the part removal unit.

Housing 73 is provided with several openings. The openings allow air to reach the inner housing. As both housings 72 and 73 are provided with a ventilation unit, for ventilating vapours and removing the label part respectively, inlet of air from outside housing 73 is preferred as otherwise the ventilations would hinder each other. Draught from the part removal unit could result in spreading the vapours resulting from laser cutting.

The part removal unit comprises in an embodiment two hoses 75,76 connected to the inlet (not shown in FIG. 3). Each hose is connected to a respective chamber 77,78 comprising a filter bag 79,80, similar to a bag in vacuum cleaner. The chambers 77,78 are closed by a door 81.82 and connected to one or more pumps. In an embodiment a switch is provided that allows to switch between creating an under pressure in chamber 77 and chamber 78. A under pressure can be created in the respective chambers 77,78. The filter bags allow penetration of air, but not of material particles. This allows collecting the removed parts in the filter bags 79,80. If a bag is full, this can be detected automatically with a suitable sensor, not shown, the part removal unit can switch from 'vacuum cleaning' with a full filter bag to the empty filter bag. This allows continuous operation. The full filter bag can be replaced by an operator by opening the door.

Figure 4:
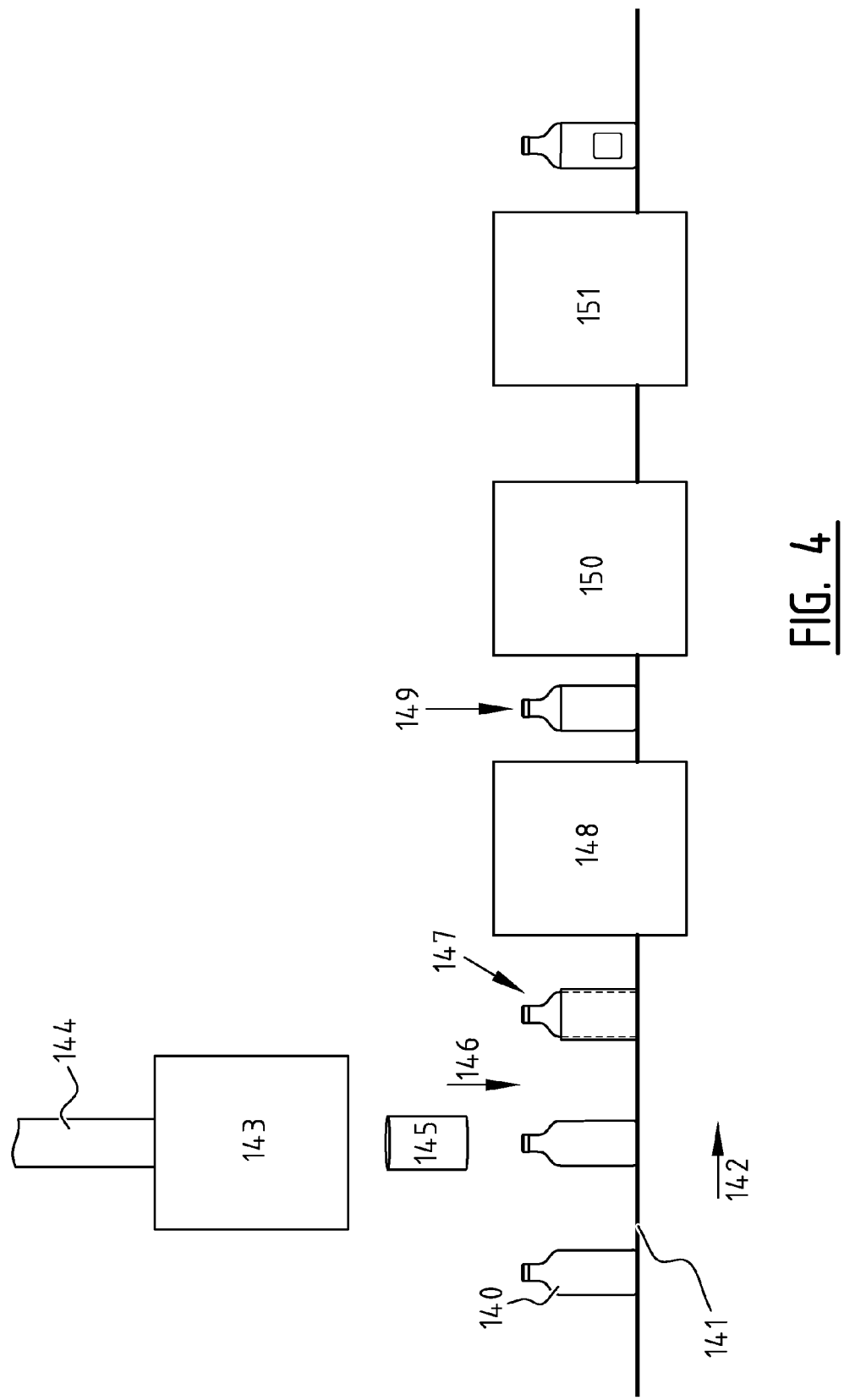
FIG. 4 shows a third embodiment of the invention.

FIG. 4 shows, very schematically another embodiment of the method and system according to the invention. A container 140 is transported on a conveyor 141 in direction 142. It reaches a sleeving station 143. Sleeving station 143 is provided with foil 144 of uncut sleeves. In the sleeving station sleeves 145 are formed by cutting from the foil 144 and arranged 146 over the container 140. This can be a continuous process and is well known as such from prior art.

A sleeved container 147 is transported to an oven 148. In the oven the sleeve will be heated to shrink by, such as heated steam vapor, resulting in attaching the sleeve around the container. The container is now a labelled container 149.

In a further downstream station 150 the labelled container is dried to remove water droplets. Station 151 is a schematic representation of the system as shown in FIG. 1 and comprises a positioning, trigger sensor, laser cutter and part removal unit as described earlier.

FIG. 4 shows an embodiment of a complete system for sleeving a container and removing part of the label after sleeving and heat shrinking.

Figure 5:
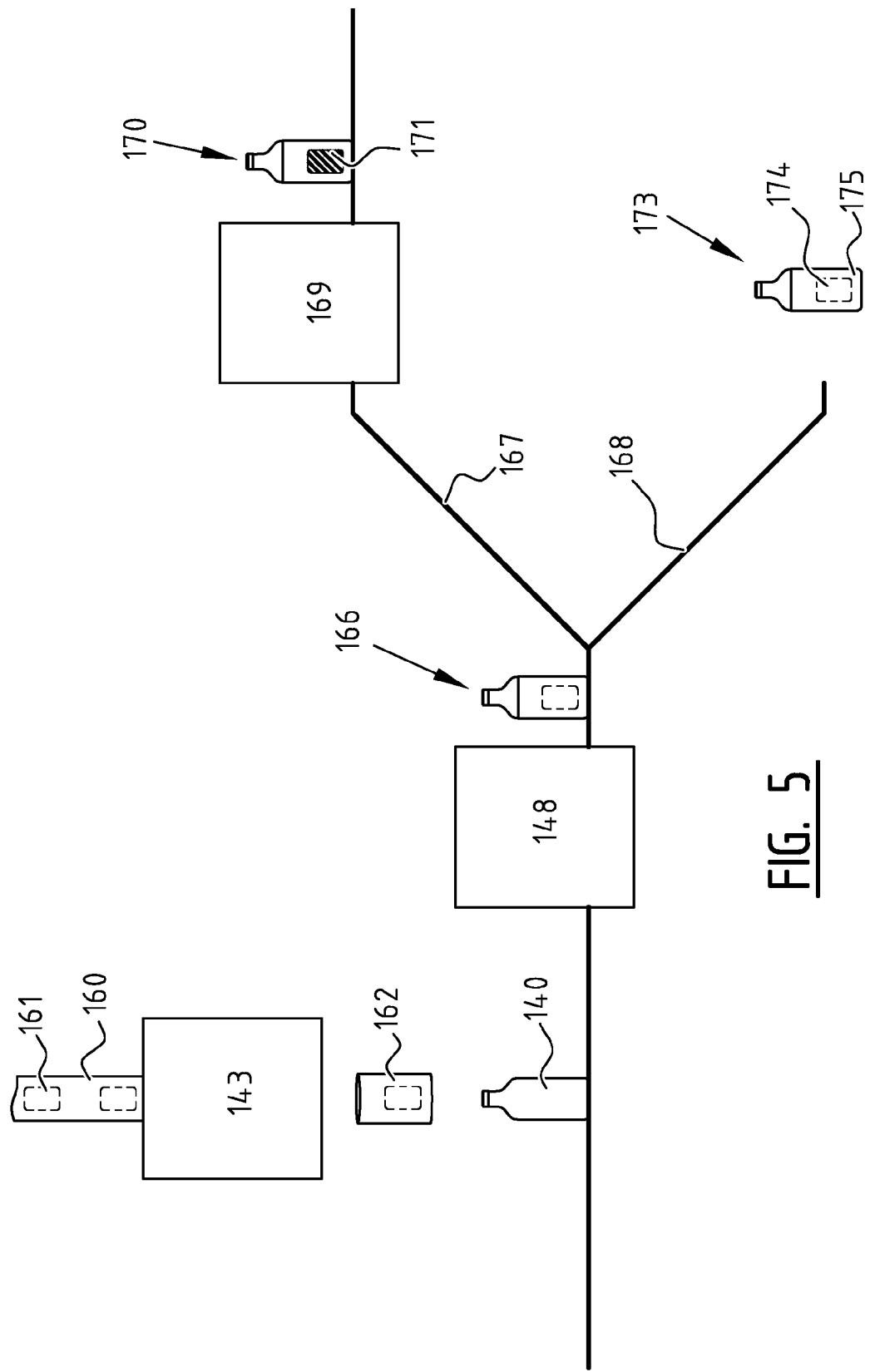
FIG. 5 shows a fourth embodiment according to the invention.

FIG. 5 shows yet another embodiment. Foil 160 is now already provided with perforations 161. Foil 160 is fed to sleeving unit 143. A separate sleeve 162 with perforation 163 is formed and arranged around a container 140.

After heat shrinking the sleeve 162 around the container, the labelled container 166 having the perforation can either be processed further, step 167, to an embodiment of the part removal unit 169, e.g. embodied by an air inlet as described above. In an embodiment the part removal unit comprises the sensor 106 for triggering the part removal. The part removal unit 169 can remove the part of the label surrounded by perforations. This results in end product 170: a labelled container having a part 171 of the label removed.

In another embodiment, step 168, the sleeved container 166 is not processed further and a sleeved container 173 having a part 174 surrounded by perforations 175 is obtained.

Further the laser cutting according to the invention can be used to remove irregularities such as irregularities as a result of heat shrinking the sleeve. Occasionally pieces of foil/sleeve arranged around a container can show 'smiling'. These irregularities can be sensed by a suitable sensor 106, informing and triggering the laser device 107 to apply a certain laser cutting pattern, e.g. uploaded via memory 31 connected to the sensor 106. After laser cutting the part is removed using the part removal unit 120.

FIG. 6 shows a labelled container 200 that can be obtained using an embodiment of the method described in this document. Container 200 has a chamber 201 formed in side wall 202 of the container. This chamber 201 is a deepening in the container. In an embodiment the deepening can be form a handle allowing to grip the large container with fingers positioned in the deepening. To position the fingers in the chamber 201, part of the label covering the chamber 201 after sleeving is removed according to the invention.

In another embodiment label 203 is provided with a perforation, either by laser cutting according to any of the embodiments shown or as a result of prior applied perforation in the foil as fed to the sleeving device as part of the system for sleeving a container. As a part of the sleeving device a product such as a toy can be positioned in the chamber 201 prior to sleeving and the small product such as a toy 205 is locked in the chamber 201 covered by the sleeve 203, especially after the heat shrinking step. A user can gain access to the chamber by removing the part of the label covering the chamber by tearing the part loose connected to the rest of the label by perforations only. This new product can be used for all kinds of advertisement purposes.

In yet another embodiment the shape of the label 182 arranged on the container 180 can be adapted. In an embodiment instead of the straight (horizontal) label (indicated by dotted line 183) at a bottom side of the label 182, part of that bottom side can be removed by laser cutting creating a curved ending 184 of the sleeve.

Near the top end 185 of the label 182 pigtails or 'smiling' as a result of excessive shrinking of the sleeve near this end having a reduced circumference, can be removed using the laser device. Using a sensor 19 having image capture capabilities, possible deformations can be recognized can be removed by first laser cutting at the desired (calculated) spot and removing the part e.g. by ventilating.

In an embodiment the curve 184 of the label is adapted to the curve 187 of the container 180, as shown in FIG. 7.

Other patterns can be cut into the label using the laser device 107 or can be formed in label prior to heat shrinking. The invention is not limited in the shape of the laser cutting. An example of a laser cutting pattern resulting in a perforation is shown in FIG. 8 and comprises a helix like perforation 191 on container 190 having label 192. A user can grip a part of the sleeve/label and, with enough force, can tear the entire label from the container. An example of a sleeve having a helix like perforation is shown in FIG. 8.

According to a further aspect of the invention a method and system are provided that allow laser cutting a labelled product such as a container, wherein the method and system provide for synchronizing the conveyed sleeved products with a laser device allowing to laser cut the desired part into the label. This method and system can be combined with any of the features described above. This method and system allow forming the product according to FIG. 8. A perforation on any shape can be obtained.

The invention claimed is:

1. A method for forming sleeved containers, the method comprising:
   conveying a row of containers,
   providing sleeves around the containers being conveyed,
   attaching each sleeve to each respective container being conveyed by heat shrinking, and
   removing a part of each sleeve after heat shrinking by:
      a first step of partially cutting the part of each sleeve after heat shrinking by laser cutting, the partially cut sleeve having one or more connecting portions with a remainder of the sleeve, and
      a second step of completely detaching the partially cut part that is attached to the respective sleeve by one or more connecting portions by tearing the partially cut part from a remainder of the sleeve via air suction after completion of partially cutting the part of each sleeve in the first step.

2. The method according to claim 1, wherein laser cutting comprises ventilating vapours formed by the laser cutting process.

3. The method according to claim 1, wherein laser cutting comprises guiding a laser beam over each sleeve to cut a desired part of each sleeve around the container being conveyed.

4. The method according to claim 1, wherein laser cutting the part of each sleeve comprises irradiating boundaries of the part, wherein boundaries extending in a circumferential direction of the container are irradiated more than boundaries extending in an axial direction of the container.

5. The method according to claim 1, wherein the method further comprises:
covering a chamber formed on an outer surface of the container by each sleeve, and
removing the part of each sleeve uncovers the chamber.

6. The method according to claim 1, wherein conveying the row of containers comprises:
detecting a position of a conveyed container, and
triggering removing the part of each sleeve, with a delay, by the detected position.

7. The method according to claim 1, wherein conveying the row of containers comprises moving the containers at a speed of at least 1 m/s.

8. The method according to claim 1, wherein the method further comprises removing water droplets on the sleeved containers after heat shrinking each sleeve.

9. The method according to claim 1, wherein attaching each sleeve to each respective container comprises gluing each sleeve to each respective container.

10. A system for forming sleeved containers, the system comprising:
a conveyor configured to transport a row of containers,
a sleeving unit configured to provide sleeves around containers, the sleeving unit being arranged to cooperate with the conveyor,
a heat oven configured to attach each sleeve to each respective container by heat shrinking, the conveyor being guided through the heat oven downstream from the sleeving unit, and
a removal unit arranged along the conveyor downstream from the heat oven, the removal unit being configured to: (i) in a first step, partially cut a part of each sleeve after heat shrinking by laser cutting with a laser device, the partially cut sleeve having one or more connecting portions with a remainder of the sleeve, and then (ii) in a second step, completely detach the partially cut part that is attached to the respective sleeve by one or more connecting portions by tearing the partially cut part from a remainder of the sleeve via air suction after completion of partially cutting the part of each sleeve in the first step, wherein:
the removal unit includes an air suction unit positioned along the conveyor, and the air suction unit is configured to completely detach the partially cut part of each sleeve by air suction.

11. The system according to claim 10, wherein the laser device comprises a control device for directing a laser beam onto each sleeve around the respective container being conveyed in a pattern in accordance with the part of each sleeve to be removed.

12. The system according to claim 10, wherein the removal unit further comprises a ventilation device for removing vapours formed as a result of laser beam irradiating each sleeve.

13. The system according to claim 10, wherein a sensor is arranged upstream from the laser device along the conveyor for detecting the sleeved container, the sensor connected to the laser device being arranged to initiate the laser device to cut the desired part of each sleeve.

14. The system according to claim 10, wherein the laser device comprises a memory for storing a program for cutting a desired part of each sleeve.

15. The system according to claim 10, wherein the laser device comprises a power configuration device for varying a laser beam power.

16. The system according to claim 10, wherein the removal unit comprising the air suction unit positioned downstream from the laser device has air inlets directed towards the conveyor between the air suction unit and the laser device.

17. The system according to claim 10, wherein the air suction unit comprises an inlet nozzle positioned along the conveyor directed at least in an upstream transport direction.

18. The system according to claim 10, wherein the system further comprises a drying unit positioned downstream from the heat oven along the conveyor arranged to dry sleeved containers.

19. The method according to claim 1, wherein the air suction breaks a connection between the partially cut part and a remainder of the sleeve.

20. The system according to claim 10, wherein the air suction breaks a connection between the partially cut part and a remainder of the sleeve.

21. The method according to claim 1, wherein
the partially cut part is completely detached from a remainder of the sleeve by moving the respective container on a conveyer past an air suction unit, and
the air suction unit is stationary and positioned sideways of the conveyor.

22. The system according to claim 10, wherein
the partially cut part is completely detached from a remainder of the sleeve by moving the respective container on the conveyer past the air suction unit, and
the air suction unit is stationary and positioned sideways of the conveyor.

* * * * *